Aug. 5, 1941.  C. C. JACKSON  2,251,453
SUSPENSION MECHANISM
Filed Oct. 24, 1939  2 Sheets-Sheet 1
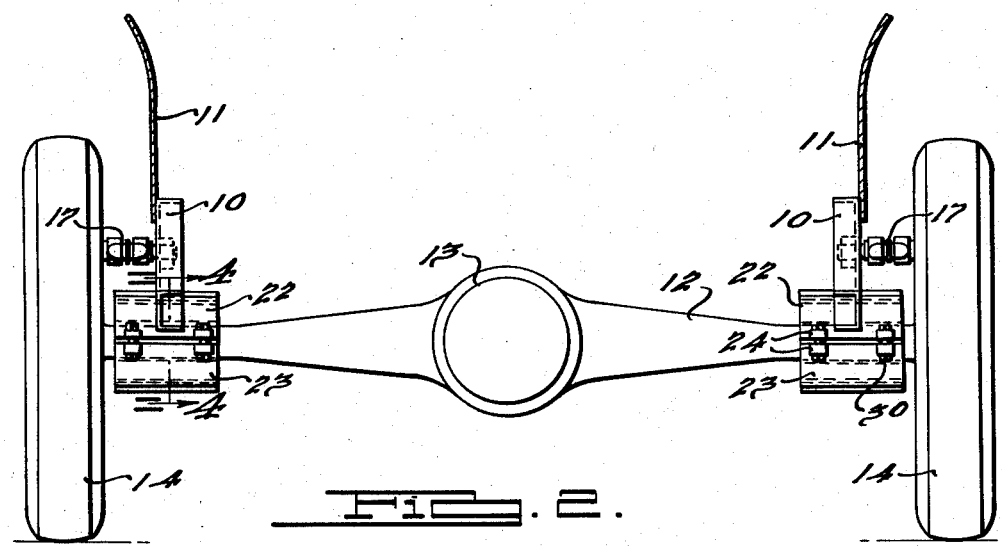
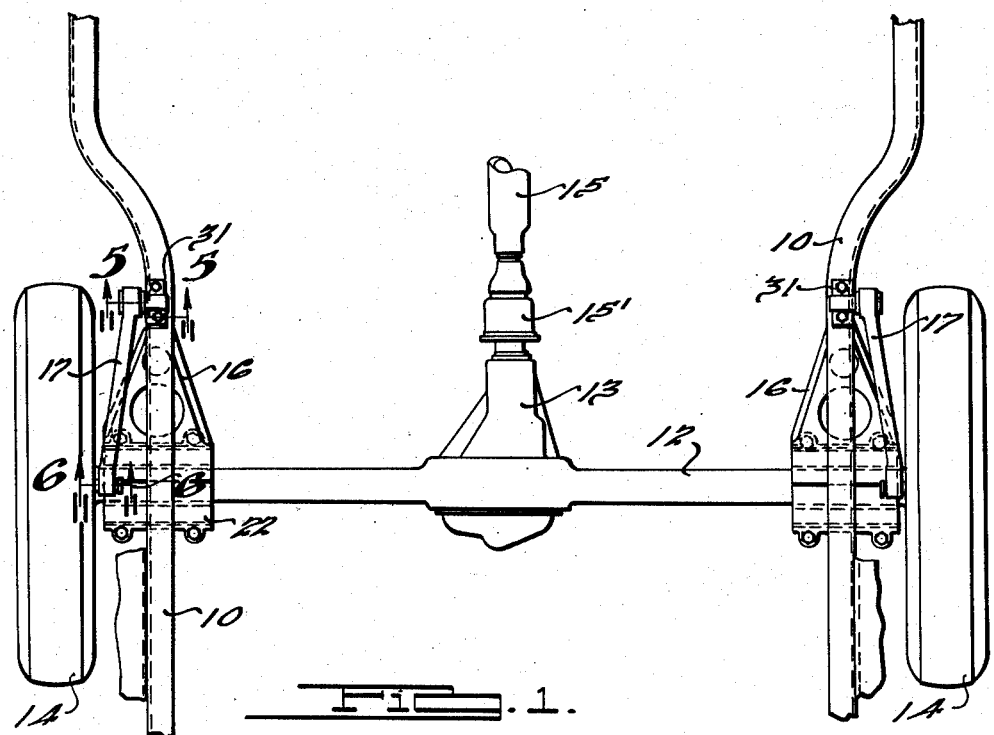
INVENTOR
Clifford C. Jackson.
BY Harness, Dind, Patee & Harris
ATTORNEYS.

Aug. 5, 1941.  C. C. JACKSON  2,251,453
SUSPENSION MECHANISM
Filed Oct. 24, 1939  2 Sheets-Sheet 2
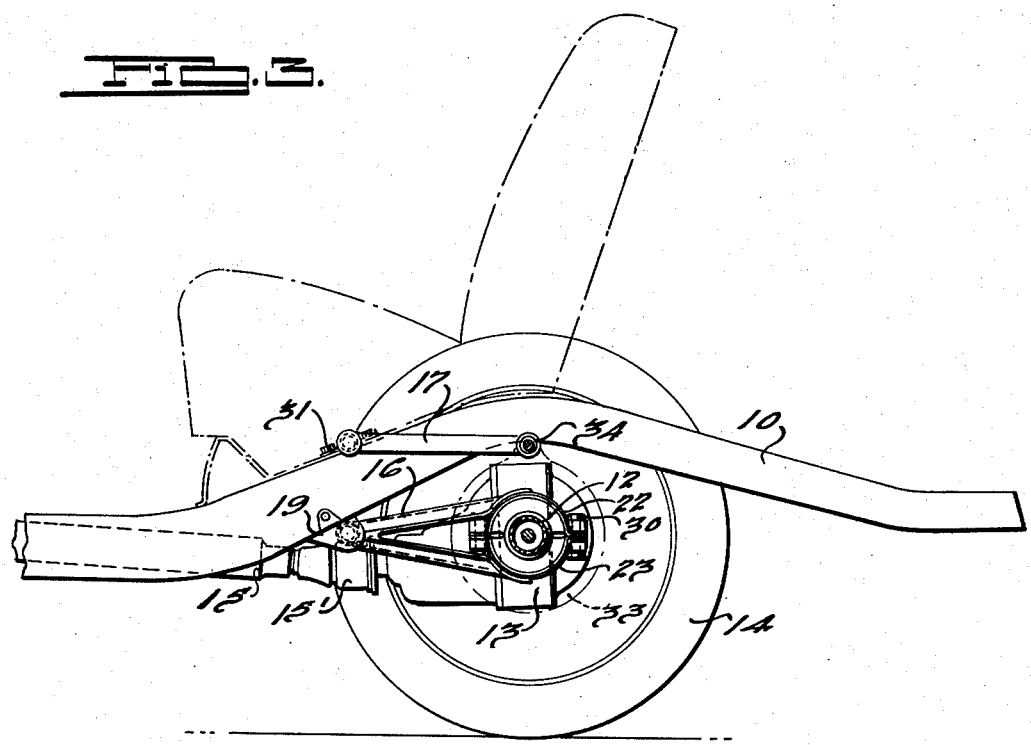
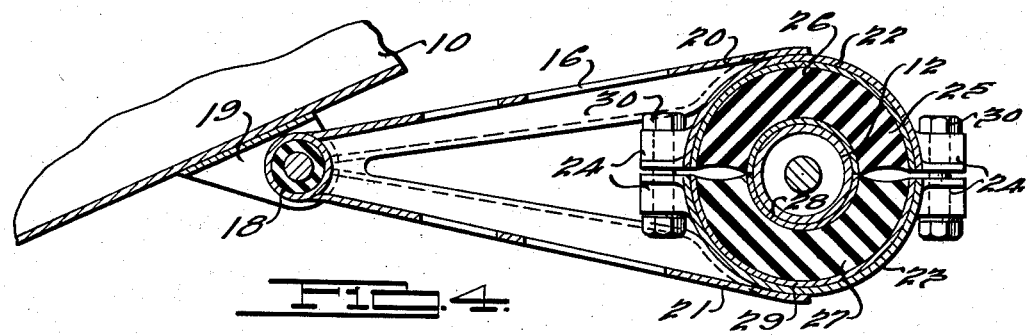
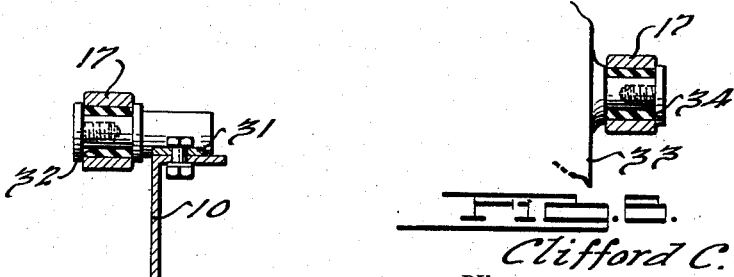
INVENTOR
Clifford C. Jackson.
BY
ATTORNEYS.

Patented Aug. 5, 1941

2,251,453

UNITED STATES PATENT OFFICE 2,251,453

SUSPENSION MECHANISM

Clifford C. Jackson, Highland Park, Mich., assignor to Chrysler Corporation, Highland Park, Mich., a corporation of Delaware Application October 24, 1939, Serial No. 301,023

7 Claims. (Cl. 267—21)

This invention relates to vehicle suspension mechanism and particularly to a suspension for automotive vehicles wherein the suspension members each consist of a torsionally yieldable unit including a body of rubber, or other material of rubber-like properties, arranged to support the load of the sprung parts of the vehicle in torsion.

The principal object of the invention is to provide in combination with a "Hotchkiss" type of drive, a suspension for the driving axle which has sufficient strength and rigidity to absorb the driving and braking stresses incident to the operation of the vehicle, yet is of simple form and economical to manufacture.

An additional object is to provide a suspension of this type in which the rubber units are carried directly by the axle.

A further object is to provide a suspension of this type which inherently provides for lateral control of the axle and which does not require the use of stabilizer bars, anti-sway bars, etc.

A still further object is to provide a rear axle suspension which requires no lubrication, but which has noise and shock absorbing qualities that are superior to the suspensions of the prior art.

Other objects and advantages of the invention will be apparent from the following description taken in connection with the following drawings, in which:

Fig. 1 is a top plan view of the improved suspension system.

Fig. 2 is a rear elevation of the same.

Fig. 3 is a side elevation of the same.

Fig. 4 is a sectional view through one of the suspension members taken along the line 4—4 of Fig. 2.

Fig. 5 is a sectional view through the frame pivot connection of the guide arm taken along the line 5—5 of Fig. 1.

Fig. 6 is a sectional view through the brake drum pivot connection of the guide arm taken along the line 6—6 of Fig. 1.

Referring to the drawings in which like reference numerals designate like parts in the following description, the numeral 10 designates the chassis side sills to which the wheel-house portions 11 of the body are attached as is conventional in the art. A rear driving axle 12 provided with the usual differential housing 13 has the road wheels 14 mounted at opposite ends thereof. A propeller shaft 15 drivingly connects the differential gearing with the vehicle power plant (not shown) and has the usual universal connection 15' at its rear end adjacent the differential housing.

Each of the suspension unit assemblies, which are identical at each side of the vehicle, consists of a suspension arm 16 and a guide arm or link 17.

The suspension arm 16 is pivoted at its forward end to the side sill 10 by means of a rubber bushing 18, the connection being carried by a frame mounted bracket 19. The arm 16 is of box-like structural form and has upper and lower diverging portions 20 and 21 which extend rearwardly on opposite sides of the axle 12. Fixed to the portions 20 and 21, by welding or otherwise, are upper and lower semi-cylindrical socket members 22 and 23 provided with oppositely disposed abutment lugs or flanges 24 at each side thereof.

The socket members 22 and 23 embrace the axle housing 12 but are spaced therefrom as illustrated in Fig. 4, the space between the housing and the socket members being occupied by the suspension unit 25. The latter consists of a pair of identical semi-cylindrical structures 26 and 27, each of which comprises an inner semi-cylindrical sleeve member 28 separated from an outer semi-cylindrical sleeve member 29 by a mass of rubber which is bonded or otherwise secured to both. Upon assembly, the halves 26, 27 of the suspension unit 25 are slid into position between the axle 12 and the socket members 22, 23 and the bolts 30 are tightened to bring the lugs 24 toward each other and place the rubber under radial compressive stress. In order to make sure that the suspension unit 25 will remain immovable relative to the axle 12 and the arm 16, the respective contacting surfaces of the parts 12, 28, 29 and 23 may be serrated, splined, or other known means of preventing movement may be resorted to.

The guide link or arm 17 is preferably disposed in parallelism with the arm 16, and is pivoted at one end to the frame mounted bracket 31 by means of a rubber bushing 32 and at its other end to the brake backing plate 33 by a rubber bushing 34.

The arms 16 and 17 form part of a parallelogram which guides the axle in its movement. As is apparent from Figs. 3 and 4, rising and falling movement of the axle relative to the frame places the rubber of the unit 25 in torsional shear. By providing a parallelogram guide linkage at each side of the axle 12, the axle is guided in such manner that no twisting strains are imposed on the axle housing, a line passing through the axes of the bushing 34 and the axle being parallel to a similar line at the other side of the vehicle at all times.

Rocking movement of the axle about the axis of the propeller shaft 15 is accommodated by the rubber bushings 18, 32 and 24 and by the arms 16 and 17 which are capable of twisting to a slight degree.

As is illustrated in Figs. 1 and 2, the socket portions 22, 23 of the arms 16 are comparatively long in the axial direction of the axle, thus tendency for the frame 10 to move laterally relative to the axle is resisted by compression of the rubber in units 25. This may be readily understood by referring to Figs. 1 and 4 wherein it will be seen that lateral movement of the frame members 10 relative to axle 12 will cause swinging of the arms 16 about the rubber bushings 18. The rubber in units 25 will thus be compressed between the axle and the socket by the swinging of the arms 16 and the tendency for lateral displacement of the frame will be effectively dampened. This feature renders the use of radius rods, etc. between the axle and frame unnecessary.

Having thus described my invention, that which I claim as new and desire to secure by Letters Patent is set forth in the following claims.

I claim:

1. In a motor vehicle having a frame structure and an axle structure disposed adjacent one end of said frame structure; means associated with said structures at each side of said vehicle for supporting and guiding said axle structure for rising and falling movement comprising; a pair of arms pivoted to said frame structure and extending generally longitudinally of said vehicle, one of said arms having a pivotal connection with said axle structure, the other of said arms having a cylindrical socket portion surrounding said axle structure in spaced relation relative thereto, a mass of deformable material disposed between said axle structure and socket portion and fixed against movement relative thereto whereby rising and falling of said axle structure places said deformable material in circumferential shear.

2. In a motor vehicle having a frame structure and an axle structure disposed adjacent one end of said frame structure; means associated with said structures at each side of said vehicle for supporting and guiding said axle structure for rising and falling movement comprising; an arm pivoted to said frame structure at one end and having a socket portion at its other end, said socket portion surrounding said axle structure but spaced therefrom, a mass of deformable material disposed in the space between said axle structure and said socket portion and fixed against movement relative thereto; and a guide link pivoted at one end to said frame structure and at the other end to said axle structure.

3. In a motor vehicle having a frame structure and an axle structure disposed adjacent one end of said frame structure; means associated with said structures at each side of said vehicle for supporting and guiding said axle structure for rising and falling movement comprising; an arm pivoted to said frame structure and having a socket portion surrounding said axle structure, radially spaced metallic members fixed to said socket portion and to said axle structure respectively, a mass of torsionally yieldable material disposed between said metallic members and in engagement therewith for resisting their relative rotation; and a second arm pivoted to said frame and axle structures respectively and disposed in parallelism with said first arm.

4. The combination set forth in claim 3 in which said socket portion comprises a plurality of circumferentially discontinuous portions and adjustable means connecting said portions and operable upon adjustment to effect relative displacement of said portions for placing said torsionally yieldable material under radial stress.

5. The combination set forth in claim 3 in which the pivotal connections of said arms include yieldable bushing members for permitting a limited degree of universal movement during rocking of said axle relative to said frame.

6. In a vehicle suspension, an axle; a frame; an arm connecting said axle and frame; a torsionally active plastic body surrounding said axle and having a part fixed to said arm, and means for guiding said axle for movement relative to said frame, said axle being adapted upon movement to place said plastic body under shearing stress.

7. In a motor vehicle suspension, an arm pivoted to the frame of said vehicle and extending toward the axle thereof, said arm having divergent portions for embracing said axle, semi-cylindrical socket members fixed to said respective divergent arm portions and surrounding said axle in spaced relation relative thereto, a mass of deformable material disposed between said axle structure and socket portions and fixed against movement relative thereto, and means for guiding said axle structure whereby rising and falling of said axle structure places said deformable material in circumferential shear.

CLIFFORD C. JACKSON.